(12) United States Patent
Mudgil et al.

(10) Patent No.: US 12,197,849 B2
(45) Date of Patent: *Jan. 14, 2025

(54) DOCUMENT PARSER AND GENERATOR

(71) Applicant: Tekion Corp, Pleasanton, CA (US)

(72) Inventors: Satyavrat Mudgil, Bengaluru (IN); Anant Sitaram, San Ramon, CA (US); Akshat Gupta, Ghaziabad (IN); Fahad Tasleem, Najibabad (IN)

(73) Assignee: Tekion Corp, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/475,125

(22) Filed: Sep. 26, 2023

(65) Prior Publication Data

US 2024/0020465 A1 Jan. 18, 2024

Related U.S. Application Data

(63) Continuation of application No. 17/175,498, filed on Feb. 12, 2021, now Pat. No. 11,803,700.

(51) Int. Cl.
*G06F 40/174* (2020.01)
*G06F 40/186* (2020.01)
*G06Q 40/12* (2023.01)
*G06V 30/412* (2022.01)

(52) U.S. Cl.
CPC .......... *G06F 40/174* (2020.01); *G06F 40/186* (2020.01); *G06Q 40/125* (2013.12); *G06V 30/412* (2022.01)

(58) Field of Classification Search
CPC ..... G06F 40/186; G06F 40/174; G06N 20/00; G06Q 40/125; G06V 30/412
See application file for complete search history.

(56) References Cited

U.S. PATENT DOCUMENTS

| 7,418,656 B1 * | 8/2008 | Petersen ............... G06F 40/169 715/233 |
| 7,689,899 B2 | 3/2010 | Leymaster et al. |
| 10,769,362 B2 | 9/2020 | Kannan et al. |
| 10,990,751 B2 * | 4/2021 | Van Rotterdam .... G06V 30/418 |
| 11,030,391 B2 | 6/2021 | Matsumura |

(Continued)

FOREIGN PATENT DOCUMENTS

JP 2020-030740 A 2/2020

OTHER PUBLICATIONS

International Search Report and Written Opinion, Patent Cooperation Treaty Application No. PCT/US2021/064670, Mar. 28, 2022, 8 pages.

(Continued)

*Primary Examiner* — Kyle R Stork
(74) *Attorney, Agent, or Firm* — Fenwick & West LLP

(57) ABSTRACT

Embodiments relate to a document parser module that can receive a document template from a producing entity, parse the template, and generate a mapping between the template and identifiers of the transaction entity. Using the mapping and parsed information, a document generator module may generate a document that includes the required identifier data and meets the submission standards of the producing entity. A configuration file may be saved so that a document can be generated and submitted every reporting period with little or no additional modification by the transaction entity.

20 Claims, 13 Drawing Sheets

(56) References Cited

U.S. PATENT DOCUMENTS

| | | | |
|---|---|---|---|
| 11,803,700 B2* | 10/2023 | Mudgil | G06F 40/186 |
| 2008/0120205 A1* | 5/2008 | Hoopes | G06Q 10/087 |
| | | | 705/28 |
| 2009/0210319 A1 | 8/2009 | Rohatgi et al. | |
| 2014/0122989 A1 | 5/2014 | Eigner et al. | |
| 2015/0339285 A1* | 11/2015 | Safaei | G06Q 10/107 |
| | | | 715/256 |
| 2016/0283475 A1* | 9/2016 | Panchapakesan | G06F 16/134 |
| 2017/0154385 A1 | 6/2017 | Guzman et al. | |
| 2020/0034940 A1* | 1/2020 | Parikh | G06Q 50/163 |
| 2020/0074169 A1 | 3/2020 | Mukhopadhyay et al. | |
| 2020/0175080 A1* | 6/2020 | Bethge | G06F 16/93 |

OTHER PUBLICATIONS

Jea et al., "A generic simulation model for evaluating concurrency control protocols in native XML database systems," Computer Standards & Interfaces, Mar. 2011, vol. 33, pp. 280-291, [retrieved on Mar. 19, 2022]. Retrieved from https://www.sciencedirect.com/science/article/pii/S0920548910000929>.

United States Office Action, U.S. Appl. No. 17/175,498, Feb. 2, 2023, 23 pages.

United States Office Action, U.S. Appl. No. 17/175,498, May 13, 2022, 36 pages.

United States Office Action, U.S. Appl. No. 17/175,498, Dec. 21, 2022, 30 pages.

United States Office Action, U.S. Appl. No. 17/175,498, Jul. 30, 2021, 30 pages.

United States Office Action, U.S. Appl. No. 17/175,498, Apr. 23, 2021, 22 pages.

* cited by examiner

| Transaction Entity User Interface | | | |
|---|---|---|---|
| List of Identifiers | | | |
| ▽ Control Type: Select... | | ✗ Reset | 1,008 Results |
| | | | |
| ● Active | Identifier 1 | 001 | Value 1 | Department 1 |
| ● Active | Identifier 2 | 002 | Value 2 | Department 1 |
| ● Active | Identifier 3 | 003 | Value 3 | Department 2 |
| ● Active | Identifier 4 | 004 | Value 4 | Department 5 |
| ● Active | Identifier 5 | 005 | Value 5 | . |
| ● Active | Identifier 6 | 006 | Value 6 | . |
| ● Active | Identifier 7 | 007 | Value 7 | . |
| ● Active | Identifier 8 | 008 | Value 8 | |
| ● Active | Identifier 9 | 009 | Value 9 | |

FIG. 4

Transaction Entity User Interface

< 001 - Identifier 1    ● Active ∨

Department
[Select ∨]

Department Type
[Select ∨]

Identifier Type
[_____ ∨]

Identifier Sub-Type
[Select ∨]

Identifier Number
[_____]

Identifier Name
[Identifier 1]

Control Type *
[Customer ∨]

Productivity Type
[Select ∨]

Document Group
[Group 1 ∨]

Document Sub-Group
[A - A ∨]

☒ Control Number Mandatory

☐ Control 2 Number Mandatory

☐ Description Mandatory

Mapping

Year
[Select ∨]

501

Producing Entity Number
[Type Here]

YTD STATEMENT

TRANSACTION ENTITY:

PERIOD COVERED:

| | | | | LN NO | | | | |
|---|---|---|---|---|---|---|---|---|
| Label 51 | ■ | 2000 | 0 | | Label 54 | ■ | 3000 | 0 |
| Label 52 | | 2020 | 0 | | Label 55 | | 3010 | 0 |
| Label 53 | | 2030 | 0 | | Label 56 | | 3020/3025 | 0 |
| TOTAL | | LINES 1-3 | 0 | | Label 57 | | 3030 | 0 |
| Title | | | 0 | | Label 58 | | 3040 | 0 |
| Label 59 | | 2100 | 0 | 1 | TOTAL | | LINES 1-5 | 0 |
| Label 60 | | 2110 | 0 | 2 | Title | | | |
| Label 61 | | 2115 | 0 | 3 | Label 78 | | 3050 | 0 |
| Label 62 | | 2120 | 0 | 4 | Label 79 | | 3100 | 0 |
| Label 63 | | 2130 | 0 | 5 | Label 80 | | 3110 | 0 |
| Label 64 | | 2140 | 0 | 6 | Label 81 | | 3120 | 0 |
| Label 65 | | 2150 | 0 | 7 | Label 82 | | 3130 | 0 |
| Label 66 | | 2200 | 0 | 8 | Label 83 | | 3140 | 0 |
| Label 67 | | 2209 | 0 | 9 | Label 84 | | 3150 | 0 |
| Label 68 | | 2210/2220 | 0 | 10 | Label 85 | | 3160 | 0 |
| Label 69 | | 2240 | 0 | 11 | Label 86 | | 3170/3180 | 0 |
| Label 70 | | 2241 | 0 | 12 | Label 87 | | 3190 | 0 |
| Label 71 | | 2245 | 0 | 13 | | | 3220 | 0 |
| Label 72 | | 2246 | 0 | 14 | TOTAL | | LINES 8-17 | 0 |
| | | | | 15 | TOTAL | | LINES 6, 7 & 18 | 0 |

Transaction Entity User Interface

Transaction Entity Document

| | TITLE 1 | NO | VALUE | | NO | VALUE | | TITLE 2 | | NO | VALUE |
|---|---|---|---|---|---|---|---|---|---|---|---|
| 6 | | | | | | | | | | | |
| 7 | Label 1 | 200 | 100 | | | | | Label 5 | | 202 | 57 |
| 8 | Label 2 | 201 | 70 | | | | | Label 6 | | 300 | 111 |
| 9 | Label 3 | 202 | 5 | | | | | Label 7 | | 220 | 22 |
| 10 | Label 4 | 203 | 2 | | | | | Label 8 | | 220 | 84 |
| 11 | TOTAL | | 177 | | | | | Label 9 | | 305 | 75 |
| 12 | | | | | | | | Label 10 | | 310 | 13 |
| 13 | Label 12 | | 85 | | 260 | | | | | | |
| 14 | Label 13 | | 76 | | 261 | | | | 89 | | |
| 15 | Label 14 | | 90 | | 262 | | | Label 11 | | | |
| 16 | Label 15 | | 103 | | 263 | | | Label 17 | | 311 | 101 |
| 17 | Label 16 | | 88 | | 264 | | | Label 18 | | 312 | 115 |
| 18 | TOTAL | | 442 | | | | | Label 19 | | 314 | 89 |
| 19 | Label 31 | | 85 | | 285 | | | Label 20 | | 320 | 80 |
| 20 | Label 32 | | 66 | | 286 | | | Label 21 | | 321 | 23 |
| 21 | Label 33 | | 72 | | 287 | | | Label 22 | | 322 | 49 |
| 22 | | | | | | | | Label 23 | | 323 | 65 |

Column 1005     Column 1011

Page 2 – Title 2
Page 3 – Title 3
Page 4 – Title 4
Page 5 – Title 5
Page 6 – Title 6
Page 7 – Title 7
Page 8 – Title 8

Tabs 1001

FIG. 10

DOCUMENT PARSER AND GENERATOR

CROSS-REFERENCE TO RELATED APPLICATION

This application is a continuation of U.S. patent application Ser. No. 17/175,498, filed on Feb. 12, 2021, which is hereby incorporated by reference in its entirety.

BACKGROUND

Field of Disclosure

The present disclosure generally relates to a document parser, and specifically, a document parser for data submission acceptance between different entities.

Description of the Related Art

A transaction entity is required to periodically transmit a document to a producing entity for acceptance. The producing entity requires that the document be in a required format for document acceptance by the producing entity. The transaction entity must manually create the document for document acceptance which is tedious as the required format changes over time and may be different for different producing entities.

SUMMARY

To overcome these limitations, embodiments of a transaction entity system include a document parser module and a document generator module. The document parser module receives a document template from any producing entity and parses each page of the document template to identify document attributes. The document attributes include fields in the template, locations of the fields, and data types of data to be input into each of the fields. The parser creates a two-way mapping between fields in the document template of the producing entity and one or more identifiers of the transaction entity system. The document attributes of the document template and mapping are saved in a configuration file.

Using the configuration file, a document generator module may generate a customized document that meets the producing entity's submission standards. Specifically, the document generator uses the mapping to pull identifier data from one or more transaction entity identifiers and uses the parsed template information to render a document that meets the requirements of the producing entity. The configuration file may be saved so that a producing entity document can be generated and submitted periodically with little or no additional modification. Thus, the document parser and generator modules allow transaction entities to quickly and seamlessly generate documents tailored to specific producing entities.

The above and other needs are met by a computer-implemented method, a non-transitory computer-readable storage medium storing executable code, and a system including one or more processor and a computer-readable storage medium comprising executable computer program code.

BRIEF DESCRIPTION OF DRAWINGS

FIG. 4 is a user interface that displays a list of identifiers of the transaction entity system, according to one embodiment.

FIG. 5 is a user interface that displays information of an identifier, according to one embodiment.

FIGS. 6-7 illustrate document templates received from different producing entities, according to some embodiments.

FIG. 9 illustrates a portion of a transaction entity document generated by a document generator, according to one embodiment.

FIG. 10 is a user interface that displays the portion of the transaction entity document, according to one embodiment.

DETAILED DESCRIPTION

Figure 1:
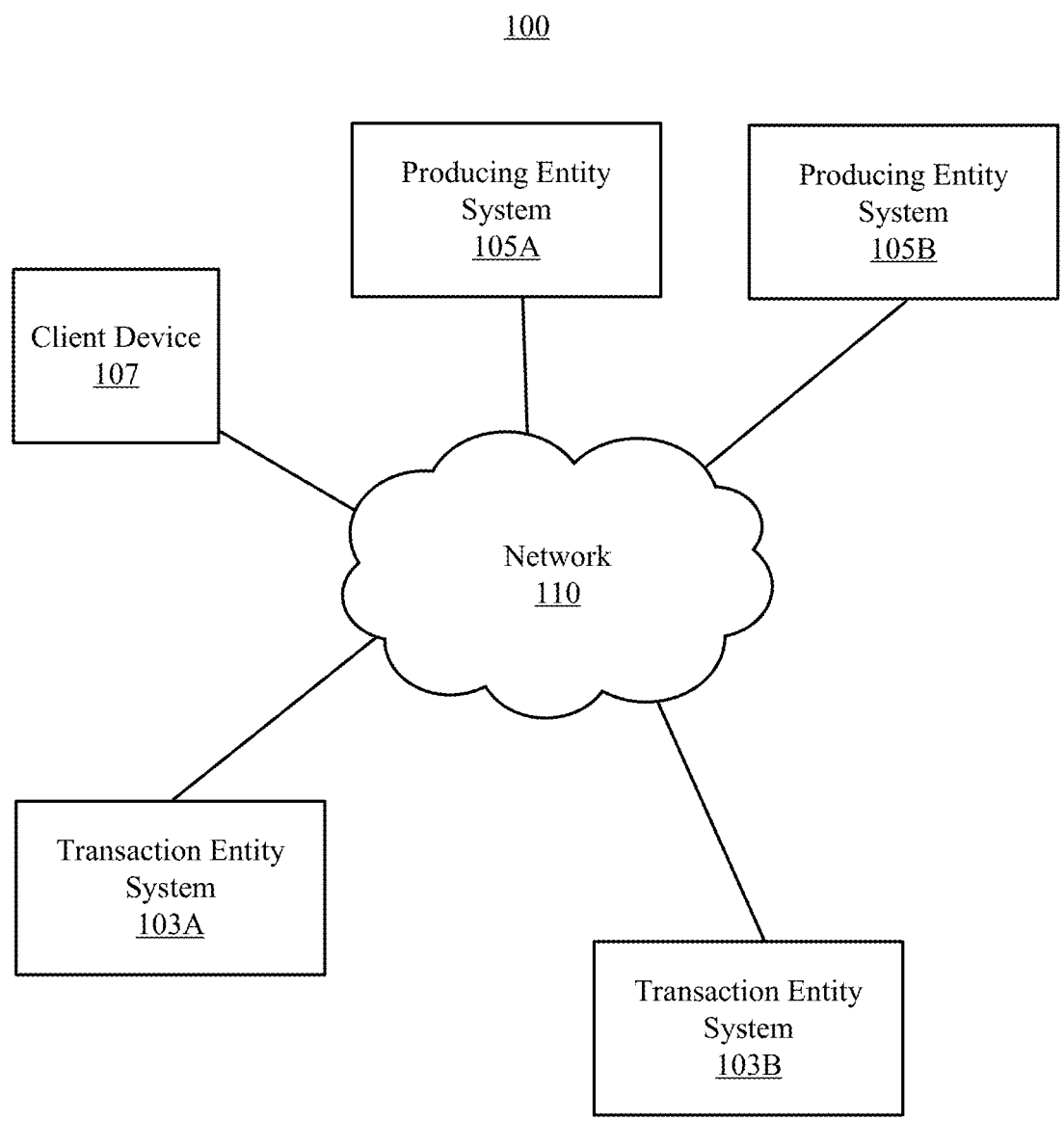
FIG. 1 is a high-level block diagram illustrating a system environment of document formatting for document approval between different entities, according to one embodiment.

The Figures (FIGS.) and the following description describe embodiments by way of illustration only. Different embodiments than described herein may be employed. Reference will now be made in detail to several embodiments that are depicted in the figures.

Embodiments relate to a document parser module that can receive a document template from a producing entity, parse the template, and generate a mapping between the template and identifiers of the transaction entity. The mapping and parsed information is stored in a configuration file. A document generator module generates a document that meets the submission standards of the producing entity according to the configuration file. A document can be generated and submitted to the producing entity every reporting period according to the configuration file. The configuration file is updated according to any updates to the document template by the producing entity.

A template is a document received from a producing entity. In one embodiment, the template defines requirements for documents transmitted to the producing entity by a transaction entity. The producing entity only accepts a document if the document is generated according to the template. In one embodiment, documents are periodically transmitted to the producing entity. In some cases, a template is a spreadsheet document, such as a MICROSOFT EXCEL document. A spreadsheet organizes data in tabular form. Specifically, a spreadsheet includes one or more tables of cells (fields in a spreadsheet may be referred to as cells). Examples spreadsheet templates are described with reference to FIGS. 6-7.

A transaction entity may receive templates from multiple different producing entities. Each template is distinct for each producing entity. For example, each template requires different template parameters including identifier data, different fields, different field formats, and has a different number of pages (also referred to as sheets). As described herein, each template includes one or more input fields and one or more non-input fields. Generally, a field is a segment or area of a document designated to store and display data, such as numeric or text data. A template may have tens of pages and each page may have any number of fields.

An input field receives data associated with the transaction entity. Each input field is associated with a non-input field. A non-input field is a field that includes text or numeric data provided by the producing entity that describes the data to be input in a corresponding input field. Examples of non-input fields include a label or title in the template. In some cases, non-input fields include references to other input fields. In these cases, a value of a non-input field is dependent on values of one or more other input fields or non-input fields. For example, the value of a non-input field is a calculation (e.g., a summation) based on the values in other fields. A field that references another field may be referred to as a derived field and a field that does not reference another field may be referred to as a simple field.

A transaction entity (TE) document is a document generated by the transaction entity. The TE document includes data related to the transaction entity. The transaction entity generates the TE according to the producing entity's template prior to transmitting the TE document to the producing entity. Thus, the TE document conforms to document requirements of the producing entity. For example, a producing entity requires that (1) certain input fields be populated with transaction entity identifier data and (2) the format of the TE document matches the layout format of a template provided by the producing entity. An example TE document is described with reference to FIG. 10. An example TE document rendered in a user interface is described with reference to FIG. 11.

FIG. 1 is a high-level block diagram illustrating a system environment 100 in which a transaction entity system 103 operates, according to one embodiment. While the embodiments herein are described in the context of a transaction entity system 103 interacting with producing entities, the techniques and systems described herein are applicable to any context where it is advantageous to parse and generate documents.

In one embodiment, the environment 100 includes a transaction entity system 103A that represents a first transaction entity, a transaction entity system 103B that represents a second transaction entity, a producing entity system 105A that represents a first producing entity, a producing entity system 105B that represents a second producing entity system, and a client device 107. A network 110 connects the different entities and devices together for communication. Different numbers of transaction entity systems, producing entity system, entity devices, and client devices may be present in the environment 100 in other embodiments.

The network 110 provides a communication infrastructure between the entities included in environment 100. The network 110 includes but is not limited to the internet, a Local Area Network (LAN), a Metropolitan Area Network (MAN), a Wide Area Network (WAN), a mobile wired or wireless network, a private network, or a virtual private network.

The transaction entity system 103 represents an operation. The transaction entity system 103 performs operations corresponding to one or more distinct producing entity systems 105. An operation may include a car dealership where the producing entity system 105 is an OEM, for example.

A producing entity system 105 represents a producing entity that produces articles. An article comprises a vehicle or vehicle parts for example. The articles are used in the operations of the transaction entity system 103. As mentioned above, an example producing entity system 105 is an OEM. In one embodiment, the producing entity system 105 requires the transaction entity system 103 to periodically transmit a TE document to the producing entity system 105. The TE document includes information corresponding to operations of the transaction entity system 103.

In one embodiment, a client device 107 is a computing device such as smartphones with an operating system such as ANDROID® or APPLE® IOS®, tablet computers, laptop computers, desktop computers, or display monitors. A client device 107 includes the hardware and software needed to input and output sound (e.g., speakers and microphone) and images, connect to the network 110 (e.g., via Wifi and/or 5G or other wireless telecommunication standards), determine the current geographic location of the client device 107 (e.g., a Global Positioning System (GPS) unit), and/or detect motion of the client device 107 (e.g., via motion sensors such as accelerometers and gyroscopes).

Figure 2:
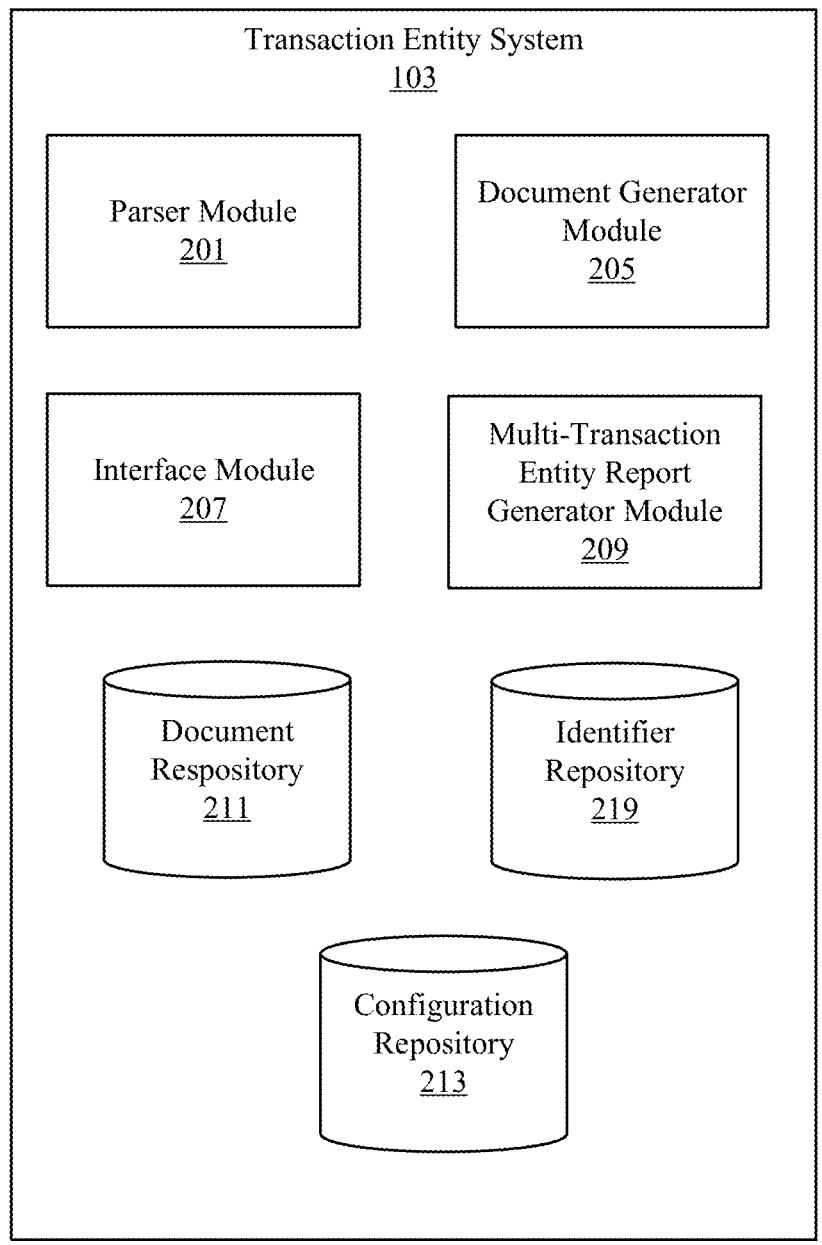
FIG. 2 is a high-level block diagram illustrating a detailed view of a transaction entity system, according to one embodiment.
Figure 3:
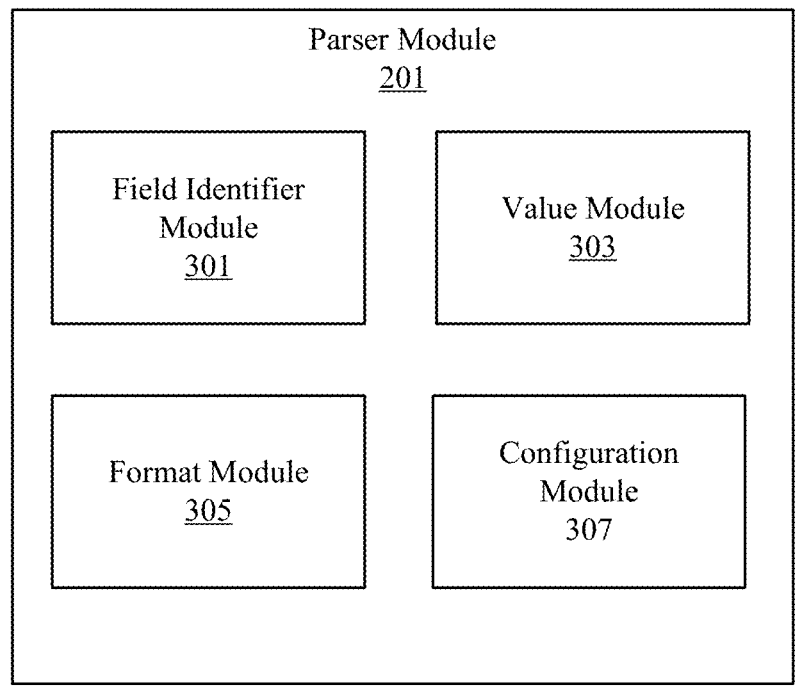
FIG. 3 is a high-level block diagram illustrating a detailed view of a parser module included in the transaction entity system, according to one embodiment.

Client devices 107 may include any device having an application that communicates with the transaction entity system 103. Generally, client devices 107 represent devices of the transaction entity system 103. Employees of the transaction entity system 103 use the client devices 107 to generate a TE document, for example. Reference will now be made to FIGS. 2-3. FIG. 2 is a high-level block diagram illustrating a detailed view of a transaction entity system 103, according to one embodiment. The transaction entity system 103 includes a parser module 201, a document generator module 205, an interface module 207, a document repository 211, a configuration repository 213, and an identifier repository 219.

The parser module 201 parses document templates received from producing entity systems 105. The parser module may parse a template to identify fields, locations of the fields, formats of the fields, and types of data values to be input into the fields. For example, if the template is a spreadsheet with tables of cells the parser module 201 may identify the cells and their locations in the tables, the formats of the cells, and the types of data values to be input into the cells. The parser module 201 may also create a mapping between the parsed template and identifiers of the transaction entity system 103. The parser module 201 is configured to receive any type of document template. Thus, document templates from different producing entity systems 105 with, for example, different sizes, different values, and different formats, may be received and parsed by the parser module 201.

FIG. 3 is a high-level block diagram illustrating a detailed view of the parser module 201, according to one embodiment. The parser module 201 includes a field identifier module 301, a value module 303, a format module 305, and a configuration module 307. In other embodiments, the transaction entity system 103 and the parser module 201 may include other modules and/or repositories (databases) than those illustrated in FIGS. 2-3. For example, the transaction entity system 103 may include a retriever module that retrieves document templates from producing entities. The modules and databases in FIGS. 2-3 may be located on a local computing machine or may be stored across multiple computing machines associated with the transaction entity system 103.

Referring to FIG. 3, the field identifier module 301 determines fields and the locations of the fields in a template by scanning the template. If the template is a text document, the field identifier module 301 identifies the pages and locations of fields on each page of the document. If the template is a spreadsheet, the field ID module 301 identifies the pages of the spreadsheet, tables within each page, and locations of cells within each of the tables.

The value module 303 determines the types of values to be input into the identified fields. The value module 303 may be a script that is executed by the parser module 201. To determine the types of values, the value module 303 may first determine which of the identified fields are input fields and which are non-input fields.

As previously described, input fields are fields intended to receive data from the transaction entity system 103 (e.g., data stored in the identifier database 219), and non-input fields are fields not intended to receive data from the transaction entity system 103. Input fields may have a default data value, such as a placeholder value (e.g., the number "0") or a null value. The value module 303 may recognize the input fields due to including a default value. Since non-input fields typically have data provided by the producing entity system (e.g., text data, numeric data, or references to other fields), non-input fields may be recognized by the absence of default values. The data in non-input fields may be identified and stored for use by the document generator module 205.

After a field is identified as an input field, the value module 303 may determine what type of data from the transaction entity system 103 should be input into the field. Said differently, the value module 303 may relate the identified input fields with types of data that may be input by the transaction entity system 103 to complete the fields. For example, the value module 303 determines a label and/or producing entity identifier number of a non-input field associated with an input field, where the label and/or producing entity identifier number indicates a data value that the input field is intended to receive. In one embodiment, producing entity identifier numbers are internal identifiers used to identify identifiers of the producing entity system 105.

The format module 305 determines formats of fields in the template. The format module 305 may be a script that is executed by the parser module 201. The format module 305 may determine format attributes of fields in a template. The format attributes include a text font (e.g., Times New Roman, Arial, or Calibri), a font style (e.g., italic, bold, and underline), a text size, a text color, a text alignment (e.g., left, center, or right alignment), and a character spacing of each field identified in the template. The format module 305 may determine non-text formatting, such as fill color and border style. In one embodiment, the format module 305 determines the numeric formatting of one or more fields in the template (e.g., if a field includes or will include numeric data). Examples of numeric formatting include a time format, a date format, scientific notation, percentage, currency, and decimal and comma placement. The format module 305 may determine any conditional formatting of fields in the template.

The configuration module 307 generates a configuration file associated with the template from the template parameters. The configuration file specifies the document requirements for TE documents generated by the transaction entity system 103. The configuration file may be stored in the configuration repository 213, which may store any number of configuration files for different producing entity systems 105.

The configuration file also includes a mapping between template input fields and identifier data of the transaction entity system 103 that is stored in the identifier database 219. The configuration module 307 generates the mapping based on the parsed template information. As will be described below, the document generator module 205 aggregates the identifier data of the transaction entity system 103 that is required by the producing entity system 105 to properly populates the fields in a TE document according to the configuration file.

In one embodiment, a relationship between labels and/or producing entity identifier numbers in a template and identifier names and/or identifier numbers of the transaction entity system 103 is predetermined. In this embodiment, the mapping may be generated by using the predetermined relationship to link the identifiers with the locations of the input fields in the template. In another embodiment, the relationship between labels and/or producing entity identifier numbers in a template and identifier names and/or identifier numbers of the transaction entity system 103 is determined dynamically. For example, a mapping is created if a label associated with an input field in the template matches or is similar to an identifier name of an identifier maintained by the transaction entity system 103. In another example, a mapping is created if a producing entity identifier number associated with an input field matches an identifier number of an identifier maintained by the transaction entity system 103.

Among other advantages, after a configuration file is generated, a configuration file may be used by the document generator module 205 any number of times to generate TE documents tailored to the producing entity system 105. For example, at the end of each reporting period, the transaction entity system 103 can create a new TE document using the configuration file. This TE document may be submitted directly to the producing entity system 105 without any further modification. As further described below, due to the mapping in the configuration file, the document generator module 205 retrieves current identifier data values from the transaction entity identifiers to generate a TE document. Thus, each time a new TE document is generated, it may include current identifier data.

A configuration file may be updated or replaced periodically by the configuration module 307. The configuration module 307 may update an existing configuration file responsive to a producing entity system 105 transmitting an updated template to the transaction entity system 103. Alternatively, the configuration module 307 may replace an existing configuration file with a new configuration file responsive to a producing entity system 105 transmitting an updated template to the transaction entity system 103. The transaction entity system 103 generates subsequent TE documents using the updated template until a subsequent update to the template is transmitted by the producing entity system 105.

Referring back to FIG. 2, the document generator module 205 generates a TE document according to a configuration file. The TE document is generated such that the TE document matches the template attributes of a template received from the producing entity system 105. However, the TE document further includes the most current operation data from the transaction entity system 105. The document generator module 205 periodically retrieves a configuration file associated with a producing entity system 105 such as at the end of each month and generates the TE document for transmittal to the producing entity system 105.

To input the data values of fields in the TE document, the document generator 205 consults the mapping in the configuration file. The mapping describes for each input field in the TE document the identifier in the identifier database from which to retrieve the data values. After a data value for an input field in the TE document is retrieved in the identifier repository 219, the document generator 205 inputs the data value into the input field in the TE document. The process is repeated by the document generator 205 for all input fields in the TE document.

TE documents generated by the document generator module 205 are stored in the document repository 211. The document repository 211 may also store templates received from producing entities.

The document generator module 205 may generate a TE document in one or more different file formats. For example, the document generator module 205 generates a TE document in one or more file formats such as a markup language format (e.g., xml), a spreadsheet format, or a document format (e.g., pdf). The document generator module 205 may transmit the TE document to the interface module 207. The interface module 207 renders the TE document for display in an interface of the client device 107. The interface is used to edit the TE document if needed. The interface is also used to interact with the transaction entity system 103. Example screens of the interface generated by the interface module 207 are illustrated in FIGS. 4-5, 9, and 11 and are further described below.

Among other advantages, the parser module 201 and document generator module 205 together can create TE documents based on different templates for different producing entity systems 105. For example, the parser module 201 receives and creates configuration files for templates with different file formats, page numbers, field locations, and field formats for different templates for different producing entities. Additionally, due to the mapping between transaction entity identifiers and producing entity identifier numbers, the document generator module 205 can create TE documents that are populated with the specific identifier data desired by the producing entity systems 105. Thus, the transaction entity system 103 can create TE documents that are tailored to the specific formatting and data requirements for each producing entity system 105.

The identifier repository 219 stores identifiers associated with operations of the transaction entity system 103. Each identifier includes one or more entries of data that describe the operations. The data stored in entries in the identifier repository 218 are used to complete the TE document. Data retrieved from the entries for inclusion in the TE document is identifier data in one embodiment.

FIG. 4 is an interface that displays a summary of identifiers maintained by the transaction entity system 103, according to an embodiment. The listed identifiers may be stored in the identifier database 219. Each identifier has a name and identifier number in the transaction entity system 103.

FIG. 5 is an interface that displays attributes of each identifier. The attributes of the identifier in the transaction entity system 103 include the number and name. The attributes may also include the producing entity system identifier 501 that corresponds to the identifier in the transaction entity system 103.

Figure 6:
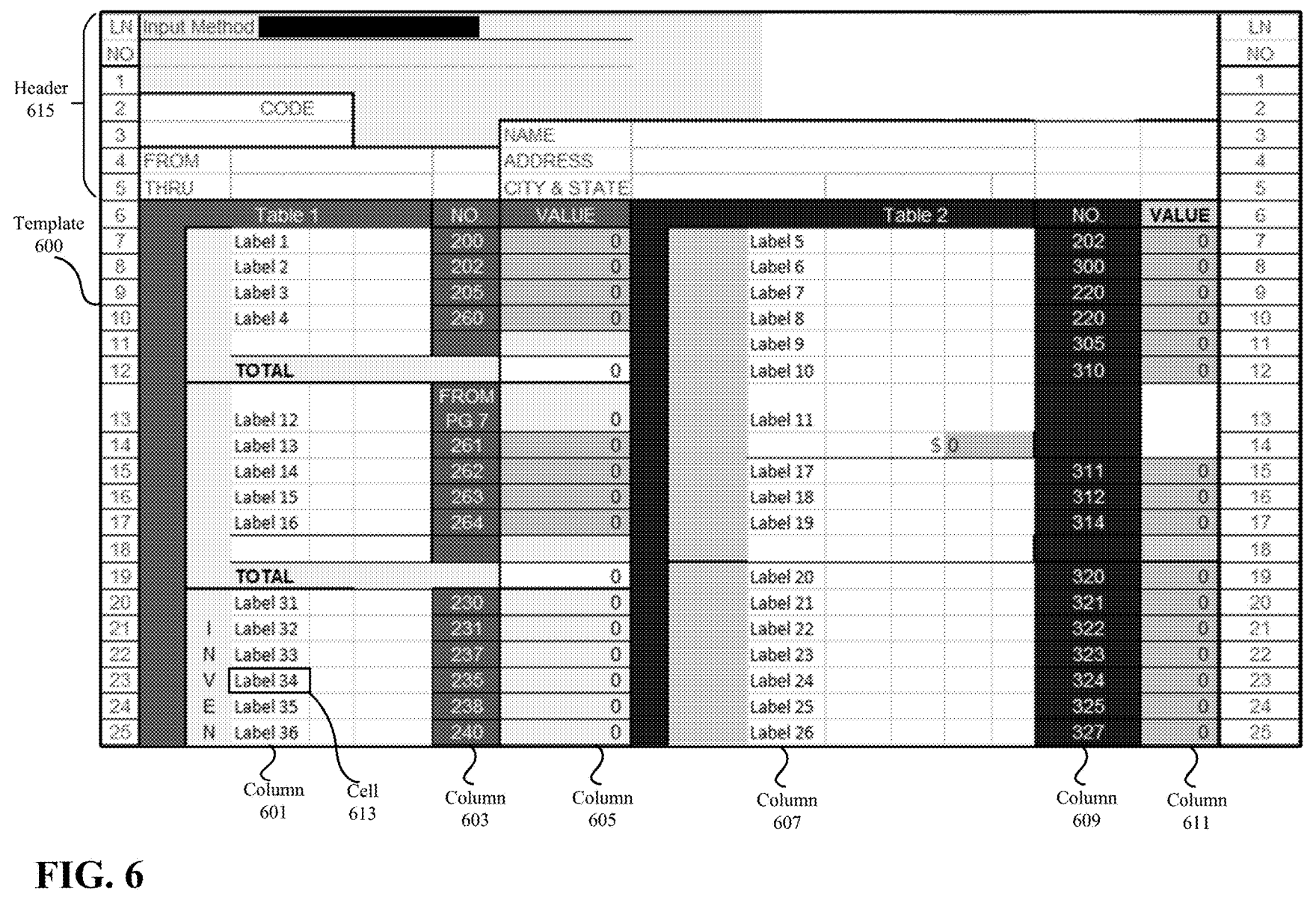

FIGS. 6-7 illustrate document templates received from different producing entity systems 105, according to some embodiments. In the examples of FIGS. 6-7, the templates are spreadsheets with tables of cells (see example cell 613) and each template includes a header section and two tables: table 1 (left) and table 2 (right). While not illustrated, each of the templates may include multiple pages.

FIG. 6 illustrates a portion of a document template 600 received from a first producing entity system such as producing entity system 105A. The header section 615 includes cells related to overview information, such as the reporting period, a dealer code of the transaction entity, and the name and address of the transaction entity. In table 1, column 605 includes input cells that are intended to receive identifier data from the transaction entity system 103. Columns 601 and 603 include non-input cells that provide descriptive information for the input cells in column 605. Specifically, column 601 includes labels associated with column 605 and column 603 includes producing entity identifier numbers associated with the column 605. As previously stated, producing entity identifier numbers are internal numbers used by the producing entity system to identify identifiers. Similarly, for table 2, column 611 includes input cells, column 607 includes labels and column 609 includes producing entity identifier numbers associated with the input cells in column 611. The remaining cells in tables 1 and 2 may be non-input cells that include descriptive information and formatting. The labels in columns 601 and 607 may refer to specific identifiers maintained by the transaction entity system 103.

Note that not all rows in column 605 are input cells. For example, rows 12 and 19 in column 605 are non-input cells that indicate the sum of the values above them. Specifically, row 12 is the sum of the values in rows 7-10 and row 19 is the sum of the values in rows 13-17. In another example, row 13 in column 605 is a non-input cell that reflects a value calculated on page 7 of template 600 (page 7 not illustrated).

FIG. 7 illustrates a portion of a document template 700 received from a second producing entity system. The header section 715 includes cells related to overview information, such as the name the transaction entity system and the reporting period. In table 1, columns 705A and 705B include input cells, and columns 701 and 703 include non-input cells. Column 701 includes labels and column 703 includes producing entity identifier numbers associated with the input cells in columns 705. Columns 705A and 705B may be different values associated with the same labels and identifier numbers. For example, column 705A includes values that are month-to-date and column 705B includes values that are year-to-date. In another example, column 705A includes values past due over 30 days and column 705B includes values for the current period. In table 2, column 711 includes input cells, and columns 707 and 709 include non-input cells. Column 707 includes labels and column 709 includes producing entity identifier numbers associated with the input cells in column 711. The remaining cells in tables 1 and 2 may be non-input cells that include descriptive information and formatting. Similar to template 600, not all rows in columns 705 and 711 are input cells. Specifically, row 4 in column 705 and rows 6-7 and 18-19 in column 711 are non-input cells that indicate the sum of the values above them.

As can be seen by comparing FIGS. 6-7, each template is unique compared to the other template. Among other aspects, the locations of the cells, the format of the cells, the number of pages (not illustrated), and the types of data to be input into the cells are different in each of the templates. For example, equivalent labels across the templates may have different column and row positions in each of the templates. For example, label 1 in template 600 and label 59 in template 700 may refer to a same transaction entity identifier despite having different relative template locations. Furthermore, since producing entity identifier numbers are internal numbers used by each producing entity system 105, the producing entity identifier numbers in each template are unrelated to the producing entity identifier numbers in the other template. Thus, FIGS. 6-7 illustrate how producing entities may provide unique templates to be completed.

Figure 8:
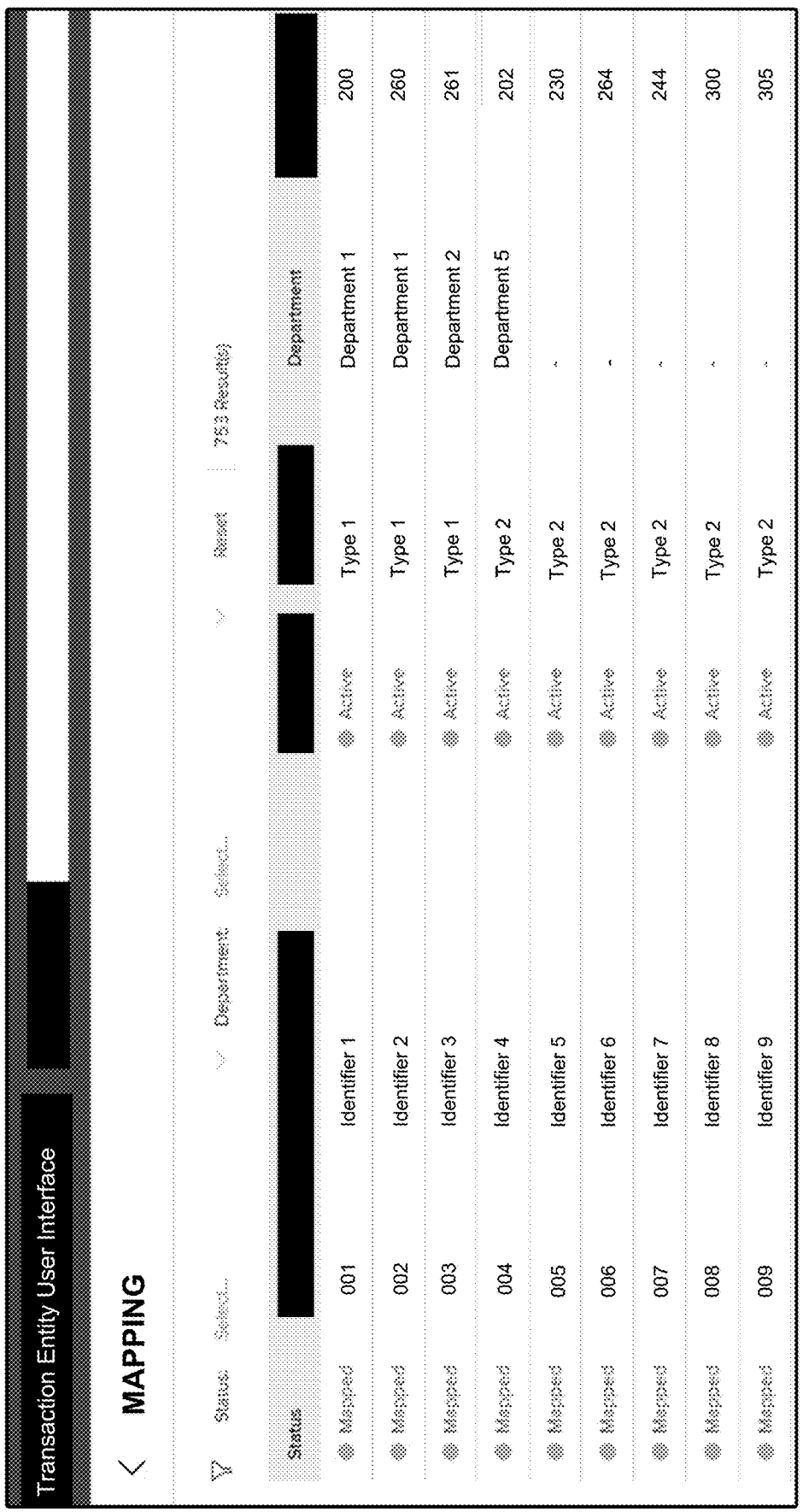
FIG. 8 is a user interface that displays an internal mapping between transaction entity identifiers and producing entity identifier numbers, according to one embodiment.

FIG. 8 is an interface that displays an internal mapping between transaction entity identifiers and producing entity identifier numbers, according to an embodiment. The mapping may be displayed by pulling mapping data in a configuration file. In the example of FIG. 8, the interface displays a mapping between the identifiers illustrated in FIG. 4 and the producing entity identifier numbers in FIG. 6. For example, identifier "001" of the transaction entity system 103 maps to identifier "200" of the producing entity system 105.

Figure 9:
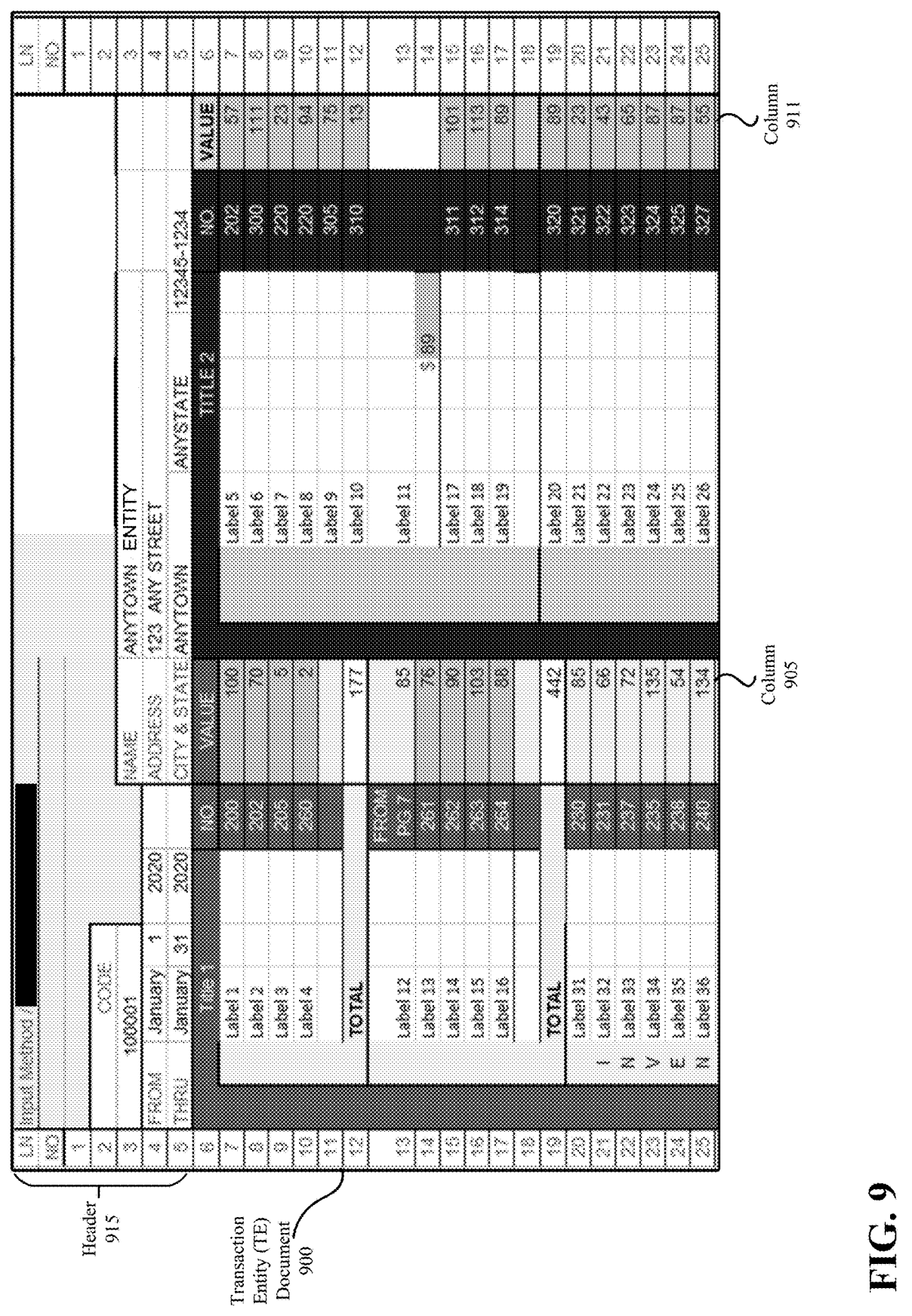

FIG. 9 illustrates a portion of a TE document 900 generated by the document generator module 205, according to an embodiment. As seen by comparing TE document 900 with template 600, the document generator module 205 used the configuration file of template 600 to generate the TE document 900. Due to this, the locations of the fields, the formats of the fields, and the formats of the data in the fields match those of template 600.

Compared to template 600, fields in the header section 915 are populated to include the reporting period (Jan. 1, 2020 through Jan. 31, 2020), the transaction entity code (100001), and the name and address of the transaction entity system (Anytown Transaction entity). Furthermore, fields in columns 905 and 911 are populated to include identifier data of the transaction entity system 103. The remaining fields include data that matches the non-input fields of template 600. Since the configuration file of template 600 was used to generate the TE document 900, the TE document 900 includes the specific identifier data desired by the first producing entity system. Additionally, TE document 900 may meet the submission standards of the first producing entity system.

In one embodiment, the transaction entity system 103 transmits the TE document to a compliance checker. The compliance checker may be included in the producing entity system 105. Alternatively, the compliance checker is a separate entity from the transaction entity system 103 and the producing entity system 105. The TE document is accepted by the producing entity system 105 if the TE document complies. The TE document may be revised for acceptance by the producing entity system 105.

FIG. 10 is a user interface that displays the portion of the TE document 900, according to one embodiment. The user interface includes tabs 1001 on the left side that reference different pages of the TE document 900. A user may view a different page of the TE document 900 by clicking on one of the tabs. In the UI, the identifier data in columns 1005 and 1011 may be updated periodically (e.g., daily) or in real-time. This allows the transaction entity system 103 to regularly track identifier data. In one embodiment, a user can use the user interface to edit the TE document 900.

In one embodiment, the document generator module 205 also generates custom document reports (e.g., similar to a TE document). The user may provide formulas (e.g., code that references one or more identifiers) that determine the content of a custom report. The document generator module 205 may retrieve identifier date from the identifier database 219 and form a document report based on the formulas. This allows the user to track characteristics of data (e.g., trends) over a predefined period of time (e.g., on a monthly basis). For example, a user can track specific trends for expense line items, such as IT costs, transaction entity system costs, and office supplies.

In one embodiment, a manager (e.g., owner) of multiple transaction entity systems 103 can to generate a custom multi-transaction entity report. In this embodiment, the transaction entity system 103 includes a multi-transaction entity report generator module 209. The multi-transaction entity report generator module 209 may have access to identifier databases 219 of multiple different transaction entity systems 103. Thus, the multi-transaction entity report generator module 209 allows the manager to select a sub-set of transaction entity systems 103, and instruct the multi-transaction entity report generator module 209 to create a custom aggregated report for all of the transaction entities in the sub-set. In one embodiment, responsive to receiving report request, the multi-transaction entity report generator module 209 may create an aggregated report for multiple transaction entites by instantiating a database that includes info for those multiple transaction entites.

Figure 11:
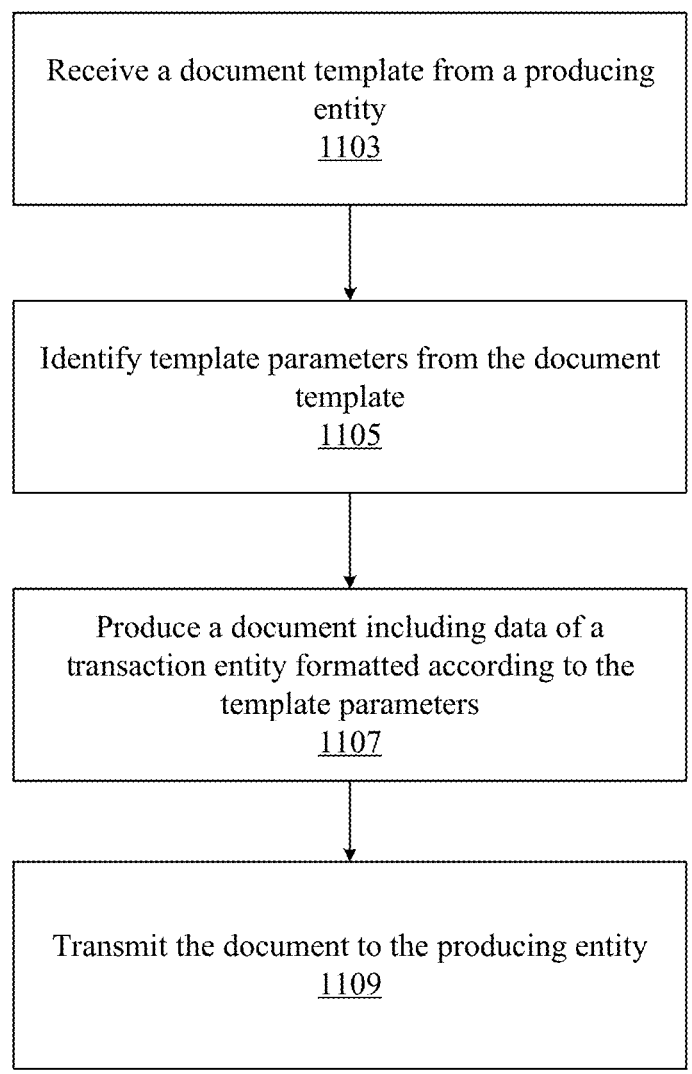
FIG. 11 is a flowchart of a method of generating a producing entity document, according to one embodiment.

FIG. 11 is a flowchart of a method 1101, according to an embodiment. The order of the method may be different. The method may include different, additional, or fewer steps.

A document template is received 1103 from a producing entity. Template parameters are identified 1105 from the document template. A document is produced 1107. The document includes data of a transaction entity. The document is transmitted 1109 to the producing entity.

Figure 12:
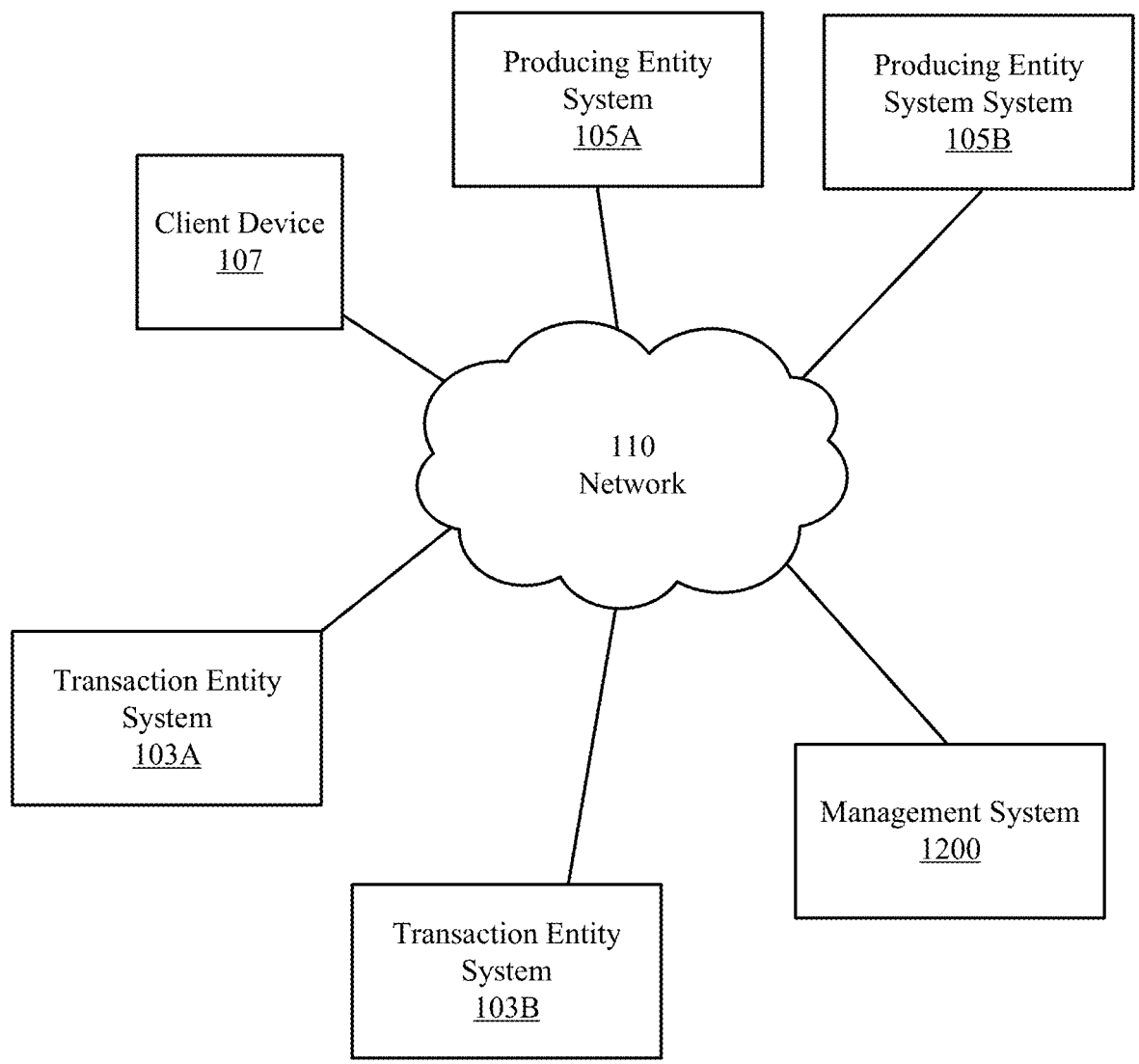
FIG. 12 is another high-level block diagram illustrating a system environment in which the transaction entity system operates, according to one embodiment.

FIG. 12 is another high-level block diagram illustrating a system environment 100 in which a transaction entity system 103 operates, according to one embodiment. FIG. 12 is similar to FIG. 1 with the addition of a management system 1200.

In FIG. 1, the functionalities of the parser module 201 and the document generator module 205 are described as being performed by the transaction entity system 103. However, this is not required. In one embodiment, the management system 1200 hosts one or more modules and/or databases of the transaction entity system 103. This may allow the transaction entity system 103 to access the modules and databases (e.g., via the network 110) without storing and running the modules or databases locally at the transaction entity system 103.

In one embodiment, one or more of the functionalities of the document parser module 201 and the generator module 205 may be performed by the management system 1200. For example, the management system 1200 includes the parser module 201. In this example, the management system 1200 may use the parser module 201 to parse templates from a plurality of producing entities. The management system 1200 may then provide the parsed data to transaction entity systems 103. If the management system 1200 has access to identifiers of transaction entity systems 103, the management system 1200 may generate configuration files for the transaction entity systems 103.

Figure 13:
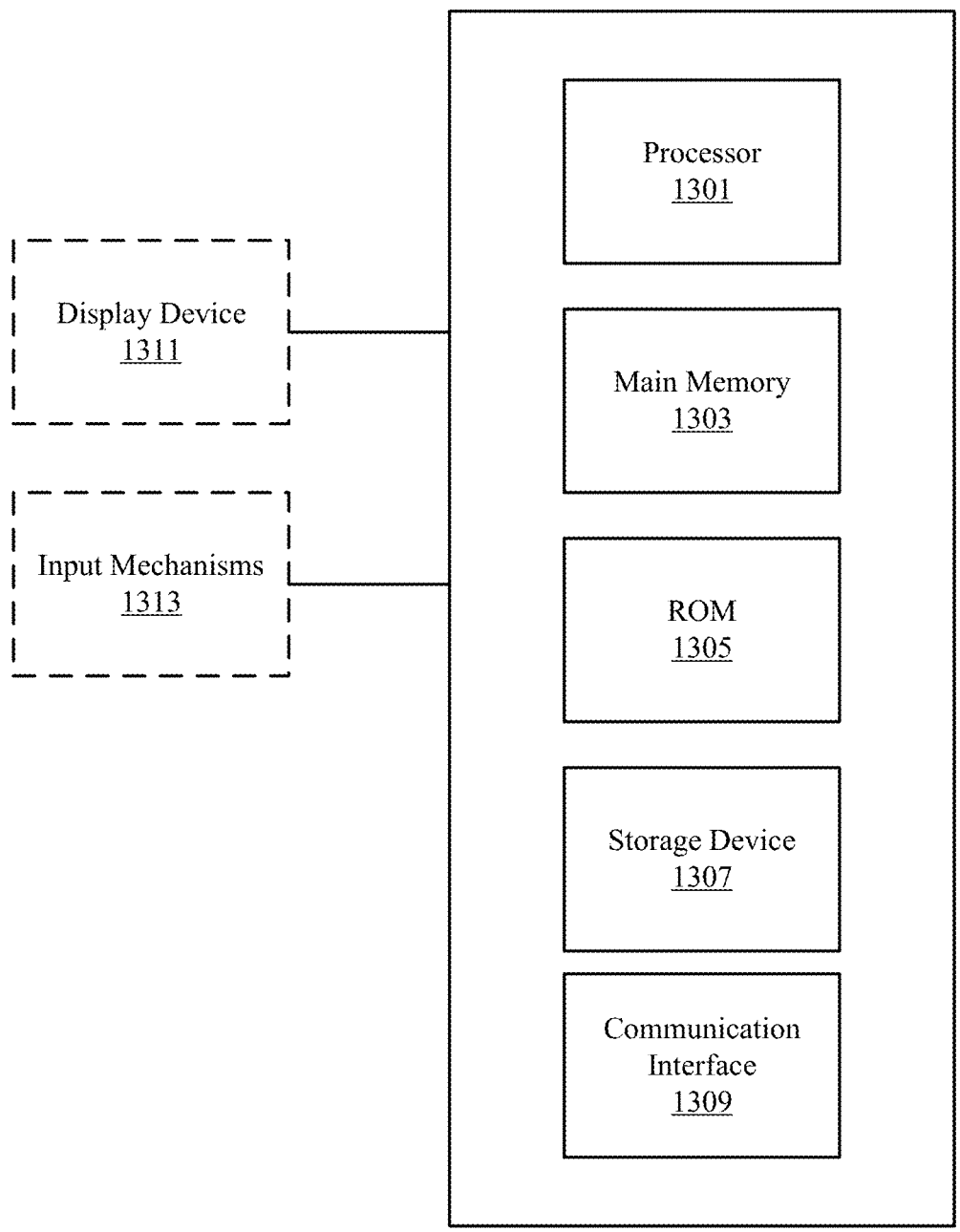
FIG. 13 is a diagram illustrating a computer system upon which embodiments described herein may be implemented according to some embodiments.

FIG. 13 is a diagram illustrating a computer system 1300 upon which embodiments described herein may be implemented. For example, in the context of FIG. 12, any of the system may each be implemented using a computer system 1300. Any of the systems may also be implemented using a combination of multiple computer systems as described by FIG. 13.

In one implementation, any of the systems each include processing resources 1301, main memory 1303, read only memory (ROM) 1305, storage device 1307, and a communication interface 1309. The systems each include at least one processor 1301 for processing information and a main memory 1303, such as a random access memory (RAM) or other dynamic storage device, for storing information and instructions to be executed by the processor 1301. In one embodiment, multiple processors are employed by a system to perform the techniques described above in order to improve efficiency of the system and reduce computation time. Main memory 1303 also may be used for storing temporary variables or other intermediate information during execution of instructions to be executed by processor 1301. Each system may each also include ROM 1305 or other static storage device for storing static information and instructions for processor 1301. The storage device 1307, such as a magnetic disk or optical disk or solid state memory device, is provided for storing information and instructions.

The communication interface 1309 can enable each of the systems to communicate with each other through use of a communication link (wireless or wireline). Each of the systems can optionally include a display device 1311, such as a cathode ray tube (CRT), an LCD monitor, an LED monitor, OLED monitor, a TFT display or a television set, for example, for displaying graphics and information to a user. An input mechanism 1313, such as a keyboard that includes alphanumeric keys and other keys, can optionally be coupled to the computer system 1300 for communicating information and command selections to processor 1301. Other non-limiting, illustrative examples of input mechanisms 1313 include a mouse, a trackball, touch-sensitive screen, or cursor direction keys for communicating direction information and command selections to processor 1301 and for controlling cursor movement on display device 1311.

According to one embodiment, techniques are performed by each of the systems in response to processor 1301 executing one or more sequences of one or more instructions contained in main memory 1303. Such instructions may be read into main memory 1303 from another machine-readable medium, such as storage device 1307. Execution of the sequences of instructions contained in main memory 1303 causes processor 1301 to perform the process steps described herein. In alternative implementations, hard-wired circuitry may be used in place of or in combination with software instructions to implement examples described herein. Thus, the examples described are not limited to any specific combination of hardware circuitry and software. Furthermore, it has also proven convenient at times, to refer to arrangements of operations as modules, without loss of generality. The described operations and their associated modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method comprising:
   receiving, by a transaction entity, a first document template from a first producing entity configured to produce articles, the first document template indicative of document requirements for documents produced by the transaction entity and submitted to the first producing entity to comply with submission standards of the first producing entity, wherein the transaction entity is configured to perform transactions that include providing articles of the first producing entity to clients of the transaction entity;

identifying template parameters from the first document template, the template parameters indicative of at least required data of the first producing entity needed to comply with the submission standards of the first producing entity, the template parameters including a plurality of fields that include a common field that is included in the first document template and a second document template received from a second producing entity that is different from the first producing entity, the common field configured to receive a same type of data but is at different locations in the first document template and the second document template; and producing, by the transaction entity, a first document based on the plurality of fields, the first document including transaction data indicative of the transaction entity providing the articles of the first producing entity to the clients of the transaction entity, the first document complying with the submission standards of the first producing entity by including the transaction data that corresponds to the required data indicated in the template parameters from the first document template, wherein the first document for the first producing entity comprises the common field to comply with the submission standards of the first producing entity, and the first document is transmitted to the first producing entity.

2. The computer-implemented method of claim 1, where identifying the template parameters comprises:

parsing the first document template to identify the plurality of fields in the first document template and types of data to be entered into the plurality of fields.

3. The computer-implemented method of claim 2, wherein parsing the first document template further identifies a location of each of the plurality of fields and a data format for each of type of data.

4. The computer-implemented method of claim 3, further comprising:

generating a configuration file including the template parameters comprising the plurality of fields, the types of data, the location of each of the plurality of fields, and the data format for each type of data, wherein attributes of the first document are configured according to the configuration file that includes the template parameters.

5. The computer-implemented method of claim 4, wherein generating the configuration file further comprises:

mapping identifiers of the first producing entity with identifiers of the transaction entity, the mapped identifiers included in the configuration file.

6. The computer-implemented method of claim 5, wherein producing the first document comprises:

retrieving the data of the transaction entity that maps to the identifiers of the first producing entity according to the mapped identifiers; and inputting each of the retrieved data into one of the plurality of fields that corresponds to the retrieved data.

7. The computer-implemented method of claim 1, wherein producing the first document comprising:

producing a plurality of documents, each of the plurality of documents produced in a different file format.

8. The computer-implemented method of claim 7, further comprising:

generating an interface of a program that includes an interactable format of the first document that corresponds to the first document template; and transmitting the interface of the program to a client device of the transaction entity, the interactable format of the first document displayed in the interface.

9. The computer-implemented method of claim 4, further comprising:

receiving an updated first document template from the first producing entity;

identifying a revision to the template parameters that is included in the first document template;

updating the configuration file to include the revision to the template parameters; and producing a second document including current data of the transaction entity according to the updated configuration file, wherein the second document including the current data is transmitted to the first producing entity.

10. The computer-implemented method of claim 1, further comprising:

receiving a request for characteristics of data of the transaction entity over a predefined period of time from a client device of the transaction entity; and producing a second document including the characteristics of data, wherein the second document including the characteristics data is transmitted to the client device.

11. The computer-implemented method of claim 1, further comprising:

receiving a request for a second document that aggregates data from a plurality of different transaction entities from a client device, the plurality of different transaction entities including the transaction entity;

aggregating data from the plurality of different transaction entities; and producing the second document that includes the aggregated data from the plurality of different transaction entities, wherein the second document that includes the aggregated data is transmitted to the client device.

12. A non-transitory computer-readable storage medium comprising stored instructions, the instructions when executed cause at least one processor to perform steps comprising:

receiving, by a transaction entity, a first document template from a first producing entity configured to produce articles, the first document template indicative of document requirements for documents produced by the transaction entity and submitted to the first producing entity to comply with submission standards of the first producing entity, wherein the transaction entity is configured to perform transactions that include providing articles of the first producing entity to clients of the transaction entity;

identifying template parameters from the first document template, the template parameters indicative of at least required data of the first producing entity needed to comply with the submission standards of the first producing entity, the template parameters including a plurality of fields that include a common field that is included in the first document template and a second document template received from a second producing entity that is different from the first producing entity, the common field configured to receive a same type of data but is at different locations in the first document template and the second document template; and producing, by the transaction entity, a first document based on the plurality of fields, the first document including transaction data indicative of the transaction entity providing the articles of the first producing entity to the clients of the transaction entity, the first document complying with the submission standards of the first producing entity by including the transaction data that corresponds to the required data indicated in the template parameters from the first document template, wherein the first document for the first producing entity comprises the common field to comply with the submission standards of the first producing entity, and the first document is transmitted to the first producing entity.

13. The non-transitory computer-readable storage medium of claim 12, wherein identifying the template parameters comprises parsing the first document template to identify a plurality of fields in the first document template and types of data to be entered into the plurality of fields.

14. The non-transitory computer-readable storage medium of claim 13, wherein parsing the first document template comprises identifying a location of each of the plurality of fields and a data format for each of type of data.

15. The non-transitory computer-readable storage medium of claim 14, wherein the instructions when executed further cause the at least one processor to perform steps comprising:

generating a configuration file including the template parameters comprising the plurality of fields, the types of data, the location of each of the plurality of fields, and the data format for each type of data, wherein attributes of the first document are configured according to the configuration file that includes the template parameters.

16. The non-transitory computer-readable storage medium of claim 15, wherein generating the configuration file comprises mapping identifiers of the first producing entity with identifiers of the transaction entity, the mapped identifiers included in the configuration file.

17. The non-transitory computer-readable storage medium of claim 16, wherein producing the first document comprises:

retrieving the data of the transaction entity that maps to the identifiers of the first producing entity according to the mapped identifiers; and inputting each of the retrieved data into one of the plurality of fields that corresponds to the retrieved data.

18. A computer system comprising:
at least one processor; and
a computer-readable storage medium comprising stored instructions, the instructions when executed cause the at least one processor to:

receive, by a transaction entity, a first document template from a first producing entity configured to produce articles, the first document template indicative of document requirements for documents produced by the transaction entity and submitted to the first producing entity to comply with submission standards of the first producing entity, wherein the transaction entity is configured to perform transactions that include providing articles of the first producing entity to clients of the transaction entity;

identify template parameters from the first document template, the template parameters indicative of at least required data of the first producing entity needed to comply with the submission standards of the first producing entity, the template parameters including a plurality of fields that include a common field that is included in the first document template and a second document template received from a second producing entity that is different from the first producing entity, the common field configured to receive a same type of data but is at different locations in the first document template and the second document template; and produce, by the transaction entity, a first document based on the plurality of fields, the first document including transaction data indicative of the transaction entity providing the articles of the first producing entity to the clients of the transaction entity, the first document complying with the submission standards of the first producing entity by including the transaction data that corresponds to the required data indicated in the template parameters from the first document template, wherein the first document for the first producing entity comprises the common field to comply with the submission standards of the first producing entity, and the first document is transmitted to the first producing entity.

19. The computer system of claim 18, wherein identifying the template parameters comprises parsing the first document template to identify a plurality of fields in the first document template and types of data to be entered into the plurality of fields.

20. The computer system of claim 19, wherein parsing the first document template comprises identifying a location of each of the plurality of fields and a data format for each of type of data.

* * * * *